Aug. 28, 1951 G. H. COULTER 2,565,757
MULTIBEAM HEADLAMP INCORPORATING GRADUALLY FLUTED
REFLECTOR AND PLURALITY OF FILAMENTS
Filed June 5, 1946 5 Sheets-Sheet 1
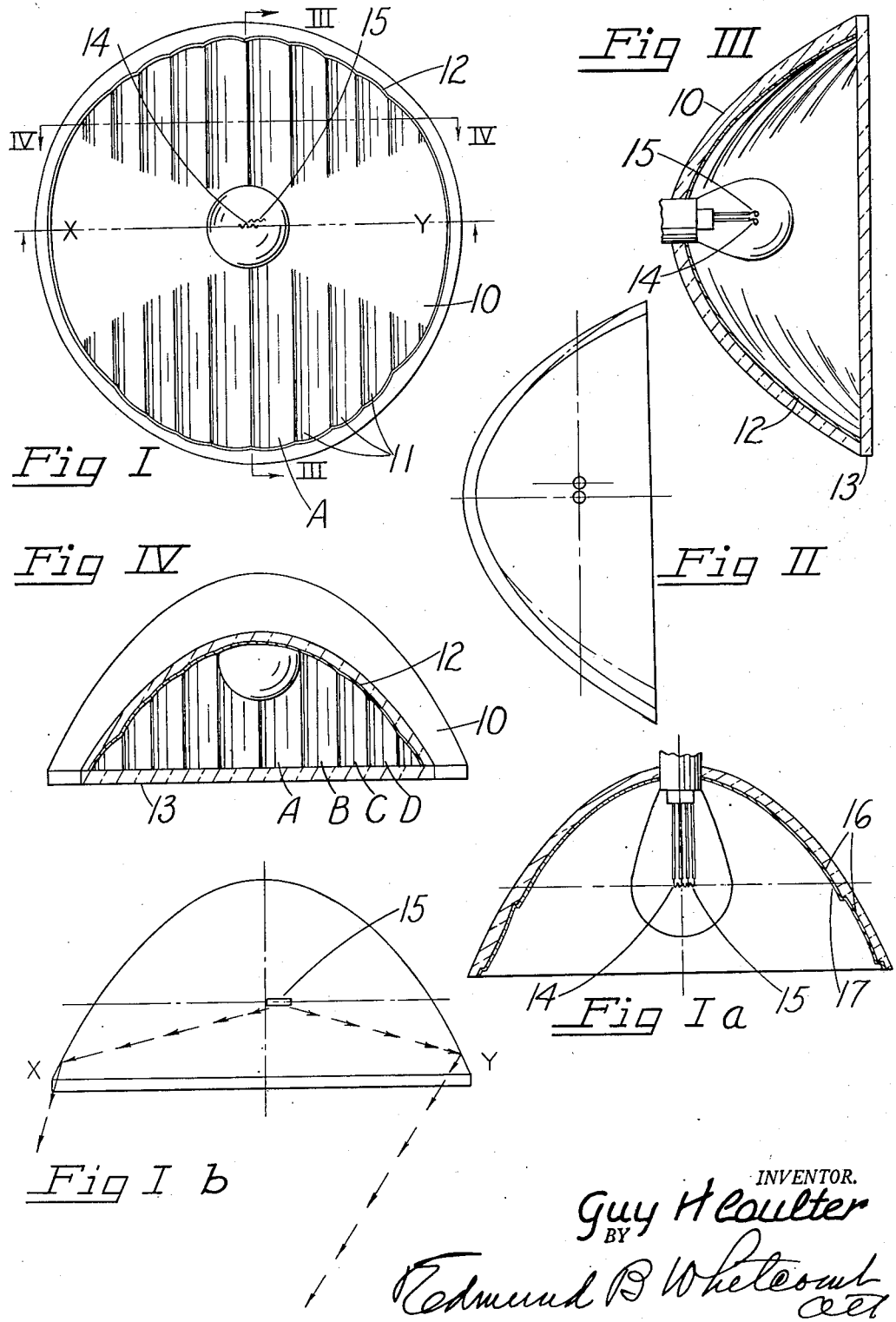
INVENTOR.
Guy H Coulter
BY
Edmund B Whitcomb Aug. 28, 1951            G. H. COULTER            2,565,757
MULTIBEAM HEADLAMP INCORPORATING GRADUALLY FLUTED
REFLECTOR AND PLURALITY OF FILAMENTS
Filed June 5, 1946            5 Sheets-Sheet 2
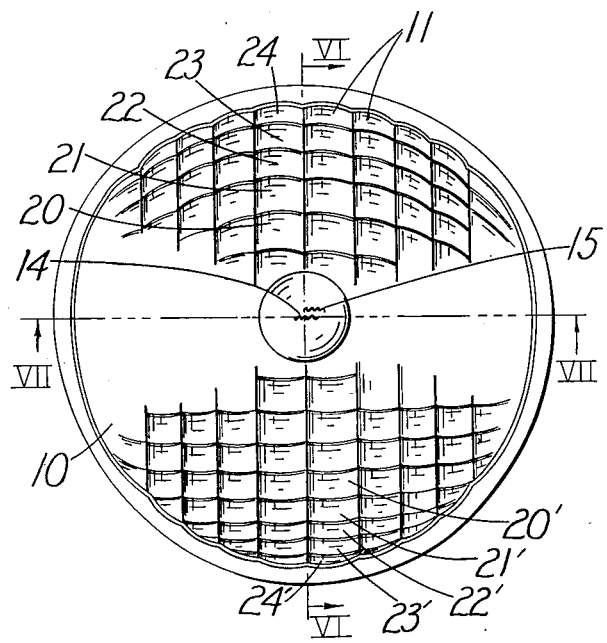
_Fig. V_
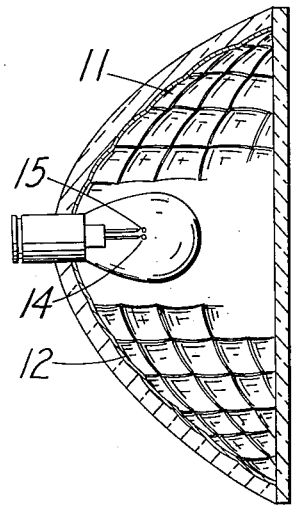
_Fig. VI_
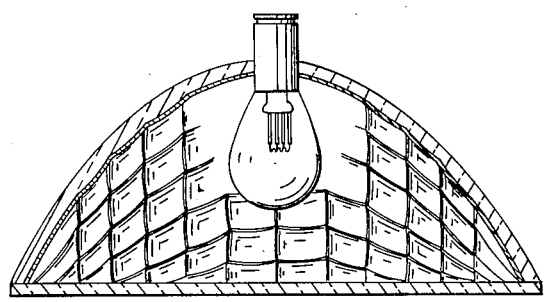
_Fig. VII_
Guy H. Coulter
INVENTOR.
BY Edmund B Whetcomb

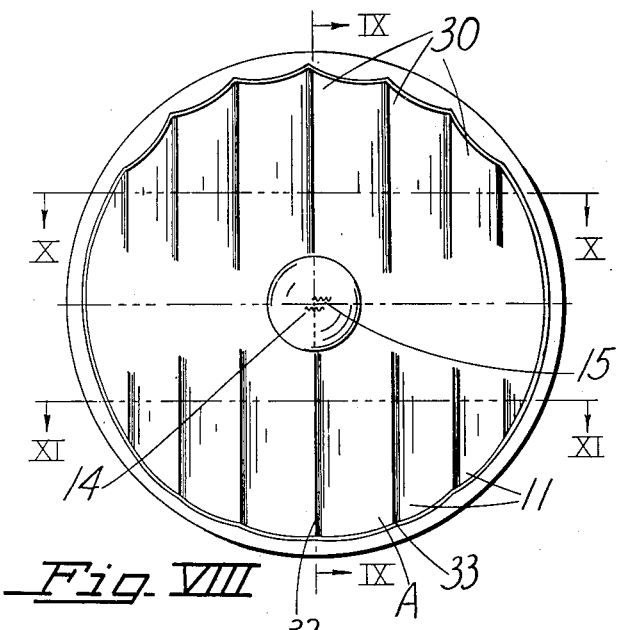
Fig. VIII
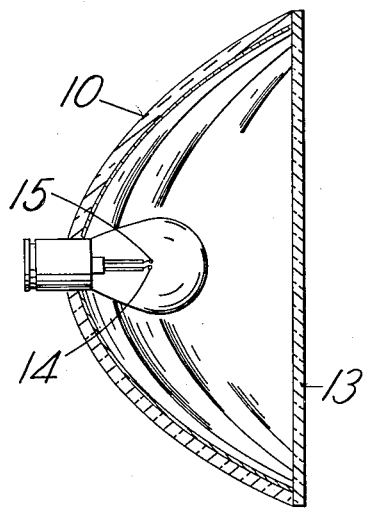
Fig. IX
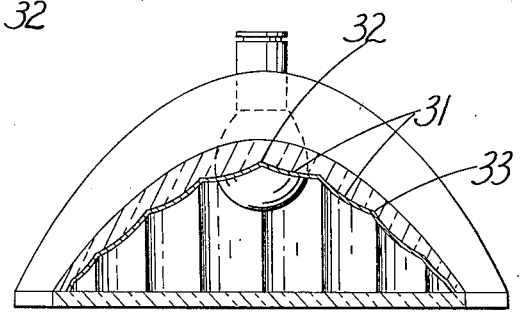
Fig. X
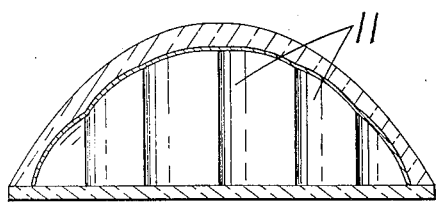
Fig. XI
Guy H Coulter
INVENTOR.
BY

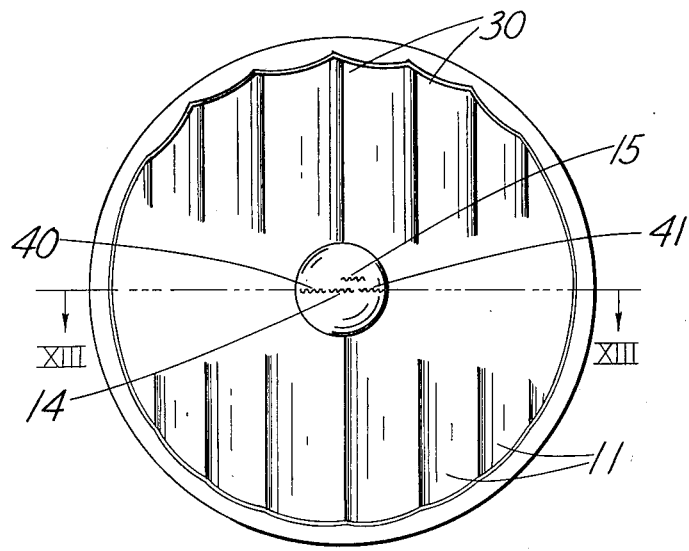
Fig. XII
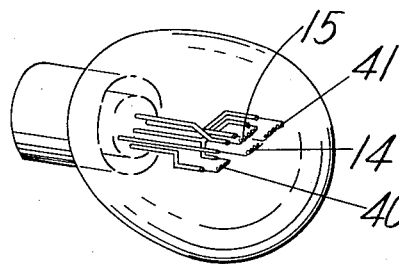
Fig. XIV
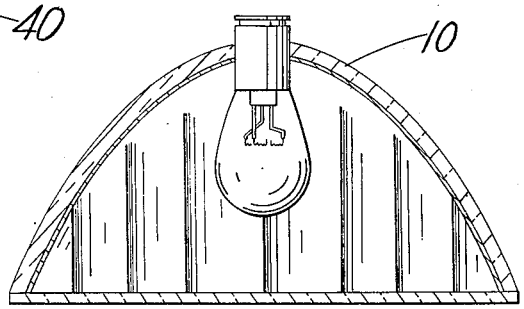
Fig. XIII
Guy H. Coulter
INVENTOR.
BY
Redmund B Whitcomb Aug. 28, 1951  G. H. COULTER  2,565,757
MULTIBEAM HEADLAMP INCORPORATING GRADUALLY FLUTED
REFLECTOR AND PLURALITY OF FILAMENTS
Filed June 5, 1946  5 Sheets-Sheet 5
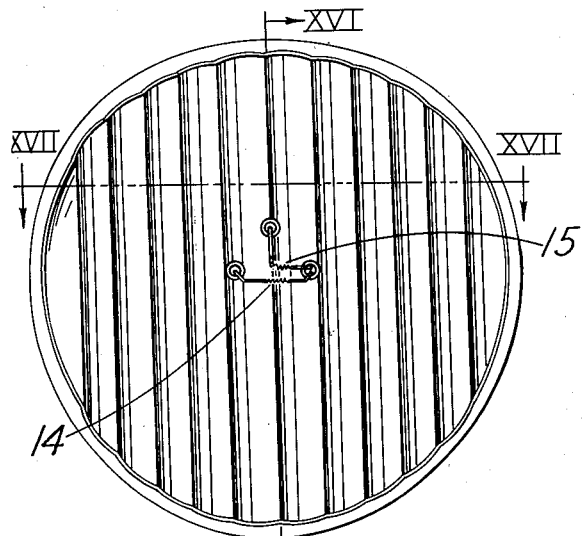
Fig. XV
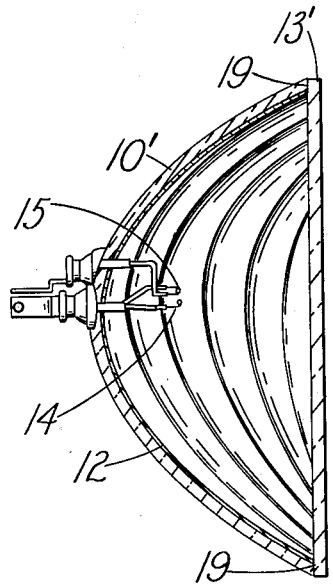
Fig. XVI
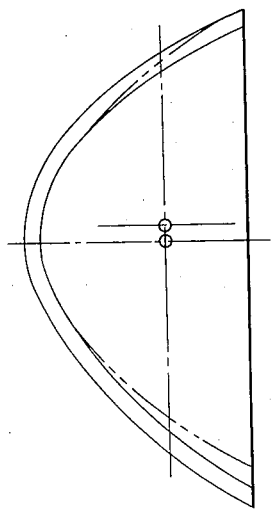
Fig. XVIII
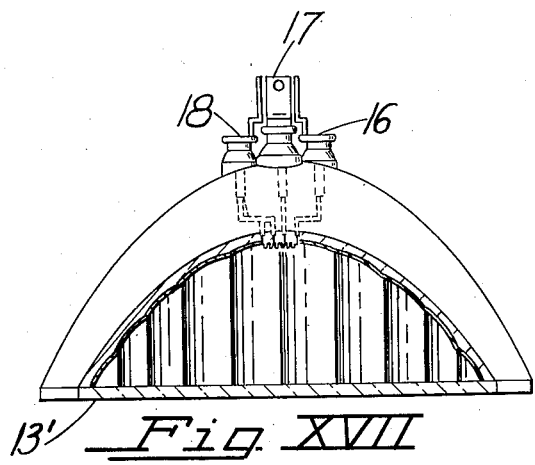
Fig. XVII
Guy H. Coulter
INVENTOR.
BY
Redmund B Whitcomb
att Patented Aug. 28, 1951

2,565,757

UNITED STATES PATENT OFFICE 2,565,757

MULTIBEAM HEAD LAMP INCORPORATING GRADUALLY FLUTED REFLECTOR AND PLURALITY OF FILAMENTS

Guy H. Coulter, Detroit, Mich., assignor, by mesne assignments, to The Electric Auto-Lite Company, Toledo, Ohio, a corporation of Ohio Application June 5, 1946, Serial No. 674,441

6 Claims. (Cl. 240—41.25)

This invention relates to automobile headlamps and has for its object the provision of an improved headlamp construction of the two filament type, in which the overall efficiency in illumination is increased and a desirable beam pattern for both the driving beams and passing beams is obtained.

One of the objects of the present invention is to provide a headlamp in which the front cover glass may be of plain construction and in which the control of the beam pattern is obtained by a novel arrangement of projecting surfaces on the concave reflector forming the back portion of the headlamp thus providing a simplified type of front cover. The plain glass absorbs much less of the transmitted light flux than is otherwise the case where flutes and prisms are required.

I have provided a reflecting surface in the headlamp which is arranged in such a manner as to provide a long distance driving light with a satisfactory degree of lateral spread, and at the same time provide a passing beam which projects a beam downwardly and toward the right hand side of the road viewed from the driver's seat and one in which objectionable glare is eliminated particularly when the filament used for the passing beam is energized.

More specifically, it is an object of my present invention to provide a series of modified paraboloidal rear reflecting surfaces to produce a beam pattern in which the light flux is generally concentrated to give good driving characteristics while at the same time may be laterally extended depending on the variations in the reflecting surfaces which I provide. Not only do I provide a series of vertically arranged concave reflecting surfaces so related to the filament position as to produce a certain paralleling effect of the light rays, but one in which the several sections may be also curved convexly and concavely viewed in a transverse manner whereby I am able to very accurately control the make up of the beam pattern and the projection of the total light flux.

A still further object of the present invention is to provide a headlight construction of the character indicated in which additional filaments and controls therefor are employed for producing the correct light projection when the automobile is turning on a right hand turn, for example, or to the left hand and one in which in conjunction therewith when the automobile is being driven straight ahead, is capable of producing a long distance driving beam of the character indicated above and a passing beam thrown downwardly and toward the right hand side of the road.

Further objects and advantages are within the scope of this invention such as relate to arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a front elevational view of one embodiment of my invention;

Figure II is a vertical sectional diagrammatic view showing the true parabola in dotted lines to illustrate the configuration of the reflector;

Figure III is a vertical sectional view taken on the line III—III of Figure I;

Figure IV is a horizontal sectional view taken on the line IV—IV of Figure I;

Figure I-a is a modification of the embodiment of Figure I in which means are provided for projecting certain rays to the right only;

Figure I-b is a diagrammatic view illustrating the operation of the embodiment of Figure I-a.

Figure V is a front elevational view of another embodiment of my invention;

Figure VI is a vertical sectional view on the line VI—VI of Figure V;

Figure VII is a horizontal sectional view taken on the line VII—VII of Figure V;

Figure VIII is a front elevational view of another embodiment of my invention;

Figure IX is a vertical sectional view taken on the line IX—IX of Figure VIII; while Figures X and XI are horizontal sectional views taken on the lines X—X and XI—XI of Figure VIII;

Figure XII is a front elevational view of an embodiment of my invention showing means to facilitate projecting proper beams for turning curves to the right hand or the left hand;

Figure XIII is a horizontal sectional view on line XIII—XIII of Figure XII;

While Figure XIV is a sectional view showing the filaments used in this embodiment of my invention;

Figure XV is a front elevational view of a still further embodiment of my invention illustrating the use of the headlamp as a bulb, in itself, without the need of a separate miniature bulb;

Figure XVI is a vertical sectional view of Figure XV;

Figure XVII is a cross section on line XVII—XVII of Figure XV;

Figure XVIII is a diagrammatic view of the model of Figure XV.

Referring to the embodiment of my invention illustrated in Figures I through IV, I have here illustrated a concave glass reflector 10 having a plurality of vertical concave flutes 11, molded into the glass reflector and provided on its front face with a suitable light reflecting surface 12 which may be an aluminized reflecting coating or a silvered reflector.

The front cover 13 of my headlight is of plain glass and the absorption of light flux is greatly reduced. This cover 13 may be suitably connected to the reflector 10 by metallic or suitable cementing compounds.

Each of the vertical concave flutes 11 extend in a substantially continuous curvature from the top of the reflector 10 to the bottom thereof. As shown in Figure II the top of each flute 11 is bent downwardly from the true parabola illustrated in dot and dash lines, while at the bottom, the lower terminal of each flute is depressed below the true parabola position as likewise shown in Figure II. While I have shown each flute 11 as vertically arranged and one parallel to the other, I intend in certain embodiments of my invention to dispose these flutes angularly with respect to the vertical but properly correlated to the focus of each flute, the locus of the foci being in the mean center of all the flutes used.

Two bar shaped filaments 14 and 15 are employed, the main filament 14 being located at focus or the locus of the foci of the several vertical flutes 13 and the other filament 15 offset both vertically and horizontally. The beam projected when the main filament 14 is energized, I refer to as the main driving beam for the motor vehicle and the headlamp projects a long distance symmetrical or slightly asymmetrical beam far down the roadway but laterally spread toward each side of the road to make an ideal country driving beam. This lateral spread is obtained by the transverse curvature given to each of the vertical flutes 11. In Figure IV I have designated several of these flutes as A, B, C, D, etcetera. In practice, in the horizontal plane passing through the main filament 14, the curvature of the flute is so flattened out as to conform substantially to the true parabola in the zone as illustrated in Figure II. Considering a point vertically from the center of flute A, for example, where the first line is indicated on Figure I, I provide a lateral spread of 3 or 4 degrees by giving the flute at this point sufficient transverse curvature to attain this amount of spread. I gradually increase the arc of transverse curvature of the flute A as I approach the top portion of the headlamp so that at the top I provide a transverse spread of from 40 to 42 degrees. Considering the lower half of one of the flutes 11, as indicated at A, I accomplish substantially the same effect by giving the flute sufficient transverse curvature near the central zone as to spread the light from 3 to 4 degrees and continuously and gradually increase the transverse curvature of the flute to consequently increase the spreading power of the light reflected therefrom to approach 40 to 42 degrees at the bottom central portion of flute A.

I locate the other filament 15 offset from the vertical axis of the reflector as well as located above the horizontal plane so as to project a beam of light from the filament 15 downwardly and toward the right hand side of the road viewed from the driver's seat. This means that the filament 15 is offset to the right looking into the headlight as in Figure I. Both filaments 14 and 15 are located as nearly as possible in what may be termed the focal plane of the reflector, or what would be the nearest to the focal plane of the several vertical sections 11 illustrated in this embodiment of my invention.

As will hereinafter more fully appear, the vertical modification of the flutes from the true parabola, as illustrated in Figure II, has the effect of throwing the light downwardly, whereas the transverse curvature to the individual flutes as illustrated in the sectional view of Figure IV as well as indicated in Figures I and III is for the purpose of spreading the light laterally.

The special location of the filament 15 not only throws the beam downwardly but directs it laterally to the right side of the road. However, some of the light, according to the optical law in relation to a parabola, particularly that in front of the focal plane emanating from the upper filament 15, instead of passing to the right is directed toward the left. An important feature of my invention is a corrective arrangement for this feature and is illustrated in Figure I where it is seen that the flutes disappear at the central zone which fans out on both sides from the central part as indicated at X and Y. By eliminating the spreading effect at these particular sections, I have found that it is possible to get the overall desired beam pattern in which, while some of the light is thrown to the left, the omission of spreading flutes at these points X and Y cuts off the additional spread which would otherwise occur. In this way I obtain the desired beam pattern with the substantial effect of throwing the "effective" passing beam down and to the right as desired.

In Figure I-a, I shown means for projecting rays emitted by the offset filament 15 and contacting the reflector in front of the focal plane also toward the right hand side of the road viewed from the driver's seat. According to the law of optics certain rays issuing from such filament 15 and contacting certain portions such as X and Y of an unmodified parabolic reflector, instead of being reflected toward the right would be projected toward the left. In Figure I-a at these sections corresponding to X and Y of Figure I, I have provided a series of specially constructed flutes 16 in which a curved transversely concaved surface 17 projects rays from the filament 15 to the right and none or substantially none to the left so that the combined light flux reflected from these sections X and Y is added to the light projected toward the right following the inherent laws of optics from the reflector at that portion located at the rear of the focal plane and emanating from the offset filament 15.

These flutes 16 are curved vertically on the contours of the slightly modified parabola as shown in Figure II. It will be noted that transversely these surfaces 17, instead of being curved one half to the right and the other half to the left as in Figures I–IV (see Figure IV), as shown in Figure I-a, these surfaces 17 are curved all in one direction as a continuous curve. In Figure I-b, I have shown diagrammatically the projection of the rays from the curved surfaces 17 at the portions X and Y of Figure I-a to be reflected by these specially constructed flutes 16. Instead of making these flutes 17 concaved they may be provided with plane surfaces or properly arranged convex reflecting surfaces at these sections.

Otherwise, the headlight of Figure I-a may be made as in the several other embodiments of my inventions herein illustrated not only in Figure I but in the other additional modifications hereof as well.

In the embodiment illustrated in Figures V, VI, and VII, I employ the concave reflector 10, vertical flutes 11, reflecting surface 12, and cooperating filaments 14 and 15, as in the embodiment of Figures I through IV. In the embodiment of Figure V, however, each of the vertical flutes 11, instead of being on a continuous curvature vertically, is made up of a plurality of independently designed flute sections illustrated at 20, 21, 22, 23, and 24, for example, for one of the central flutes 11. Each of these individual sections has a varying degree of spreading and bending power. For example, the section 20 provides very little spread—from 0 to 4 or 5 degrees. Section 21 has more spreading power, while section 22 may have a spread of from 15 to 25 degrees. The top section 24 of the central flute may have as high a spread as from 40 to 50 degrees.

The lower vertical half or section of the reflector is substantially a duplicate of the upper section with the bending and spreading power increasing from the central section 20' of the flute toward the sections such as 24' at the lower rim. In both the upper and lower half, I vary the arrangement and instead of having each successive section as viewed from the center toward the outer rim, increasing in spreading or bending power, some sections may increase and others decrease compared to the next adjoining section both above and below so that I can readily produce the most desired configuration of the light beam pattern projected by the headlamp.

It will be noted that I provide the unmodified parabolic sections fanned out as at X and Y, similar to the arrangement illustrated in the embodiment of my Figures I to IV for the same purpose referred to supra in connection with that embodiment.

In the embodiment of my invention, illustrated in Figures VIII to XI, I employ in the upper half of the reflector a series of convexly curved flutes in transverse configuration, while on the lower half the flutes are reversed and made concave as in the embodiment of Figure I. Thus, in Figure VIII the upper half of the flute 30 is convexly shaped as indicated at the high spot or line as at 31 in Figure X. In this case the vertical configuration of each flute 30, as shown by Figure X, is not modified from the true parabola at its lateral base edges 32 and 33 (Figure VIII). However, the central high portion or zone 31 in the upper half of the reflector has the same effect in modifying the downward bending power as compared with the true parabola, and I obtain results similar at this particular line to the modification illustrated in Figure II of the embodiment of Figures I to IV. The spread laterally is obtained by the transverse convex configuration of the flute. Again a downward bending effect is also obtained in the lower half of the reflector in Figure VIII since by changing from a convex flute 30 at the upper half to a concave flute 11 at the lower half (similar to the lower half of Figure I), the result produced is similar to that obtained by drawing down of the reflector from the true parabola as indicated in the lower half of Figure II.

It will be seen from Figure VIII that I provide in this embodiment the sections X and Y as in the other embodiments to prevent an improper direction of certain of the rays too far to the left, which would otherwise be the case were the spreading flutes included in these arrangements.

In Figures VIII-XI, I change the arrangement of filaments 14 and 15 and place the main filament slightly below the horizontal transverse axis through the focus, but located with the center of the filament on the central vertical axis through the focus. The other filament 15 is located offset both vertically and horizontally, substantially as in the other embodiments.

In the embodiment illustrated in Figure XII, XIII and XIV, I employ two additional separately energizable filaments 40 and 41, which are connected by the operator with a source of energy when the motor vehicle is turning to the right hand or to the left hand. Otherwise, in this embodiment I utilize substantially the same type of headlamp illustrated in the embodiment of Figures VIII to XI with the reflector 10, flutes 11 and 30, with the two straight away driving beam filaments, the main filament 14, however, being located as nearly exactly at focus as is possible, while the filament 15 is offset vertically and horizontally to throw the light toward the right hand of the side of the road as in the embodiment of Figure VIII. Moreover, as shown, the flutes 11 are formed concave at the bottom as at A in Figure VIII, and convexed at the top as particularly illustrated in Figure X.

It will be understood that in this embodiment for normal driving, the main filament 14 forms the source of the illumination for the main driving beam. When passing other vehicles the filament 15 is energized which throws the light, as heretofore stated, downwardly and toward the right hand side of the road. However, when it is desired to turn toward the right hand, the filament 40 is also energized and this throws a substantial amount of light toward the right as the vehicle begins to turn and greatly facilitates right hand turning. On the other hand, if it is desired to turn to the left, the other filament 41 is energized and likewise the beam pattern, having a large amount of light distributed toward the left is produced to facilitate left hand turning.

In the embodiment illustrated in Figures XV, XVI, XVII, and XVIII, the optical arrangement of the headlamp is substantially a duplicate of that illustrated in Figures I through IV, excepting that instead of using a miniature bulb, as illustrated in Figures I and III, the entire headlamp contained within the space formed by the concave reflector 10' and front cover glass 13' constitutes the vacuum space or gas filled space within which the several filaments 14 and 15 are located and connected with suitable lead in connectors 16, 17, and 18, as shown. In this instance it will be understood that the front cover 13' is hermetically sealed at 19 to the rim of the reflector 10'. In this embodiment I also show in Figure XVIII how the vertical flutes 11 are continuously curved on a modification of the true parabola, the latter being indicated in Figure XVIII in the dotted lines.

I also use a sealed beam type of headlamp in the embodiments of Figures V through VII instead of employing the miniature bulb there illustrated.

It is understood that the reflector in the several embodiments may be made of glass or a plastic composition, with the reflecting surface 12 supplied thereto, and in the embodiment of Figures I, V, VIII and XII the concave reflector 10 may be made of metal suitably provided with a polished reflecting front surface 12.

It is apparent that within the scope of this invention, modifications and different arrangements may be made other than is herein disclosed, and the present disclosure is illustrative merely, the invention comprehending all variations thereof.

What I claim is:

1. In a headlight, the combination of a concave reflector; said reflector comprising a plurality of individual sections, and a plurality of horizontally arranged filaments, one located substantially at the focus and symmetrically disposed with respect thereto; the other filament being horizontally but laterally and vertically offset from the focus to project a passing beam downwardly and to the right hand side of the road; a substantially transparent front cover plate for said headlight; and means to connect said front cover and said reflector; each section of said reflector comprising horizontally curved flutes, the lateral edge of each flute conforming substantially to a parabola and the central portions modified from the parabola in varying amounts vertically and horizontally from the upper and lower edges of the reflector to the central zone area thereof where the flutes gradually flatten out to conform substantially to the true parabolic central zone without forming abrupt transition surfaces.

2. In a headlight, the combination of a concave reflecting surface, said reflector comprising a plurality of vertical individual sections, each subsection being vertically curved to form a convex flute at its upper portion and transversely curved to form a concave flute at its lower portion, each section being vertically modified from a parabolic contour in variable amounts from the upper and lower edges of the reflector toward the central area thereof without forming abrupt terminal intersection surfaces so as to project light downwardly and laterally; a plurality of horizontally arranged elongated filaments, one located substantially at the focus and symmetrically disposed with respect thereto; the other filament being horizontally elongated but laterally and vertically offset from the focus to project a passing beam downwardly and to the right hand side of the road; a substantially transparent front cover plate for said headlight; and means to connect said front cover and said reflector.

3. In a headlight, the combination of a concave reflecting surface, said reflector comprising a plurality of vertical individual sections, each section being vertically curved to form a convex flute at its upper portion and transversely curved to form a concave flute at its lower portion, the transverse curvature of said convex and concave sections continuously varying from the bottom and top portions to the central zone of said reflector whereby each section is modified vertically and horizontally from a parabolic contour from the upper and lower edges of the reflector toward the central area thereof without forming abrupt intersection surfaces so as to project light downwardly and laterally; a plurality of horizontally arranged elongated filaments, one located substantially at the focus and symmetrically disposed with respect thereto; the other filament being horizontally elongated but laterally and verticaly offset from the focus to project a passing beam downwardly and to the right hand side of the road; a substantialy transparent front cover plate for said headlight; and means to connect said front cover and said reflector.

4. In a headlight, the combination of a substantially concave reflecting surface, said reflector comprising a plurality of vertically arranged sections having a parabolic central zone, each section being transversely curved, the amount of such curvature varying continuously from the bottom to the top of each of said vertically arranged sections, and the varying transverse curvature gradually disappearing at the parabolic central zone and fanning out at both sides thereof so as to project light downwardly and laterally; a plurality of horizontally arranged elongated filaments, one located substantially at the focus and symmetrically arranged with respect thereto; the other filament being horizontally elongated and located above the focus and in a vertical plane passing therethrough, but horizontally offset from a vertical line through said focus to project a passing beam downwardly and to the right hand side of the road.

5. In a headlamp the combination of a concave reflecting surface; said reflecting surface having a main transverse central section of true parabolic contour connected to modified upper and lower sections which are formed with a plurality of vertically disposed flutes, each flute having a variable transverse curvature throughout its length which gradually flattens out to conform substantially to the parabolic contour of the central section without forming transition terminal surfaces so as to project the light downwardly and laterally; a plurality of horizontally arranged elongated filaments, one located substantialy at the focus of the parabolic section and symmetrically disposed with respect thereto; the other filament being horizontally elongated but laterally and vertically offset from the focus to project a passing beam downwardly and to the right hand side of the road; a substantially plain glass front cover plate for said headlight; and means to connect said front cover and said reflector.

6. In a headlamp the combination of a concave reflecting surface; said reflecting surface having main transverse central and lateral sections of true parabolic contour and top and bottom sections formed with a plurality of vertically disposed narrow transversely curved zones, the transverse curvature of each zone gradualy flattened out to conform substantialy to the parabolic contour of the main sections without forming transition terminal surfaces and having maximum curvature at the rim of the reflecting surface so as to project light downwardly and laterally; a plurality of horizontally arranged elongated filaments, one located substantially at the focus of the parabolic sections and symmetrically disposed with respect thereto; the other filament being horizontally elongated but laterally and vertically offset from the focus to project a passing beam downwardly and to the right hand side of the road; a substantially plain glass front cover plate for said headlight; and means to connect said front cover and said reflector.

GUY H. COULTER.

REFERENCES CITED

The following references are of record in the file of this patent:

UNITED STATES PATENTS

| Number | Name | Date |
| --- | --- | --- |
| 1,411,716 | Flory | Apr. 4, 1922 |
| 1,566,906 | Matisse et al. | Dec. 22, 1925 |
| 1,633,142 | Zorger | Dec. 20, 1927 |
| 1,792,806 | Brown | Feb. 17, 1931 |
| 1,793,662 | Wood | Feb. 24, 1931 |
| 1,796,530 | Melish | Mar. 17, 1931 |
| 1,853,533 | Arbuckle | Apr. 12, 1932 |
| 1,871,505 | Falge et al. | Aug. 16, 1932 |
| 2,006,839 | Moler | July 2, 1935 |
| 2,142,384 | Taylor | Jan. 3, 1939 |